United States Patent [19]
Menzel

[11] Patent Number: 5,969,711
[45] Date of Patent: Oct. 19, 1999

[54] METHOD FOR CREATING AN ELECTRONIC DOCUMENT

[75] Inventor: Ralph E. Menzel, Westland, Mich.

[73] Assignee: Bennethum Computer Systems, West Bloomfield, Mich.

[21] Appl. No.: 08/824,367

[22] Filed: Mar. 25, 1997

[51] Int. Cl.$^6$ .................................................. G09G 5/00
[52] U.S. Cl. ...................... 345/179; 345/173; 345/509; 178/19.01; 382/188; 382/189
[58] Field of Search .................... 345/173, 179, 345/104, 509, 193, 196; 382/188, 189; 349/12; 178/19.01, 19.02, 19.03, 19.04, 19.05, 19.06, 19.07

[56] References Cited

U.S. PATENT DOCUMENTS

| | | | |
|---|---|---|---|
| 4,794,634 | 12/1988 | Torihata et al. | 379/93.19 |
| 4,839,634 | 6/1989 | More et al. | 345/173 |
| 4,873,398 | 10/1989 | Hubby, Jr. . | |
| 5,229,758 | 7/1993 | Hsu | 345/27 |
| 5,243,452 | 9/1993 | Baur | 359/55 |
| 5,455,901 | 10/1995 | Friend et al. . | |
| 5,534,893 | 7/1996 | Hansen, Jr. et al. . | |
| 5,534,896 | 7/1996 | Hanson, Jr. et al. | 345/179 |
| 5,557,301 | 9/1996 | D'Aviau de Piolant . | |
| 5,561,446 | 10/1996 | Montlick . | |
| 5,587,560 | 12/1996 | Crooks et al. . | |
| 5,652,412 | 7/1997 | Lazzouni et al. | 178/18 |

*Primary Examiner*—Dennis-Doon Chow
*Assistant Examiner*—Amr Awad
*Attorney, Agent, or Firm*—Bliss McGlynn, P.C.

[57] ABSTRACT

A method for creating an electronic document using a pen tool and a computer with a pen-sensitive screen is disclosed. The method is capable of generating the electronic document independently on a screen output display and in a persistent graphics memory. The electronic document is not generated simultaneously because transfer of the electronic document to the persistent graphics memory is a process that takes longer than generating the electronic document on the screen display output. However, this delay is not perceived by the operator because the ability for the screen output display to show what is generated by the operator is nearly simultaneous with the act of creation of the electronic document.

17 Claims, 5 Drawing Sheets

METHOD FOR CREATING AN ELECTRONIC DOCUMENT

BACKGROUND OF THE INVENTION

1. Field of the Invention

The invention relates to a method for creating an electronic document on a computer system. More particularly, the invention relates to generating electronic marks on electronic documents.

2. Description of the Related Art

As technologies advance, computer and computer-driven devices become faster. This need translates into an expectation of users that these devices should replace traditional methods of performing tasks. One such task is generating documents. Traditionally, documents are generated using a writing implement, such as a pen, and paper. Word processing systems have replaced much of the document generating task formerly relegated to the typewriter. Word processing systems are incapable, however, of easily and dynamically operating with documents having forms or charts. The act of insertion of data by an operator into these forms or charts is not performed in an intuitive manner resulting in an uneasiness on the part of the operator in performing tasks relating thereto. The uneasiness translates into less use and reduces optimization of the word processing systems.

In addition, word processing systems generally do not have capabilities to handle the interjection of handwritten notes. This further stifles the practicability of using popular word processing systems, especially in environments not suitable for typing into documents. Such environments requiring the fluidity of allowing an operator to input notes in a handwritten fashion using a pen-based computer system may include doctors offices, dentists offices, plants of manufacture, public transit systems, and the like.

U.S. Pat. No. 5,534,893, issued to Hansen, Jr., et al., on Jul. 9, 1996, discloses a method and apparatus for using a stylus-tablet input in a computer system. The stylus or pen moves along the tablet's screen of a computer system to generate a mark on an electronic document. Data generated from this electronic mark is then transferred to an input/output circuit via a bus. A microprocessor then manipulates the input/output circuit to display the electronic mark and/or store the electronic mark in memory. Although this computer system allows a user to operate an electronic document similar to traditional document generating methods, the time required to control the memory and the screen of the tablet exceeds that of its traditional counterparts. More specifically, this computer system must generate and compile so much data that a simple stroke of the pen creates a delay long enough to disrupt the operator's ability to spontaneously create an electronic document in a fashion similar to that of writing with ink and paper.

Figure 1:
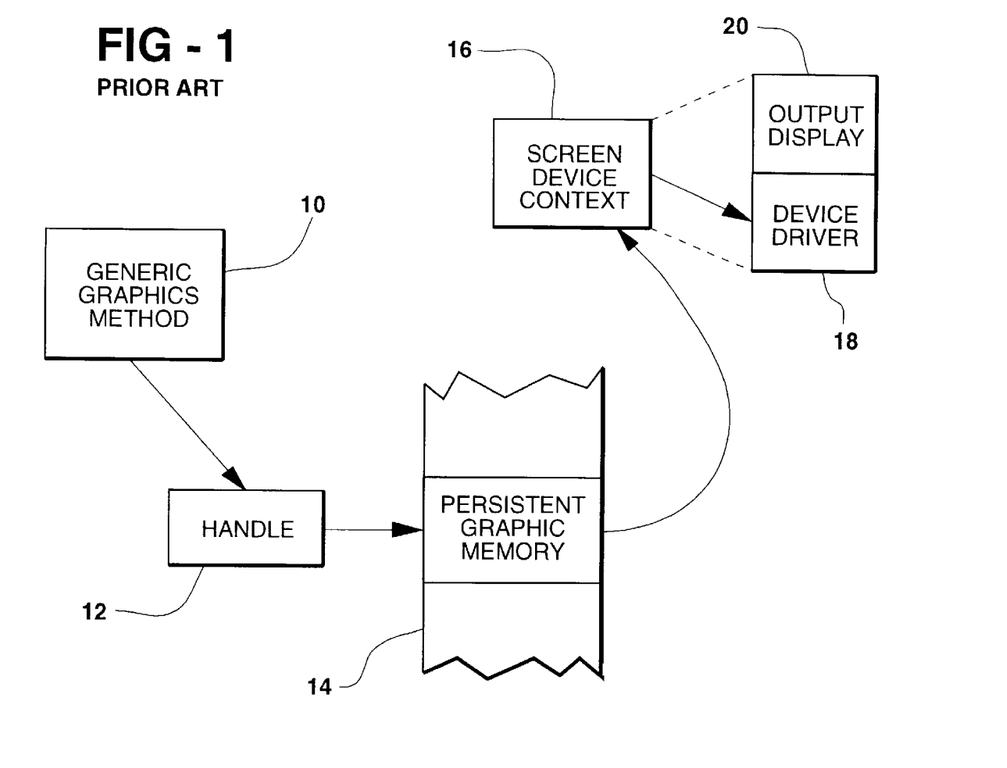
FIG. 1 is a block diagram displaying a first architecture with functional elements for a pen-based computer in the prior art.

Referring to FIG. 1, an architecture known in the prior art is shown to have a generic graphics method 10. The generic graphics method 10 may be any method used to generate graphics known to those skilled in the art. The generic graphics method 10 relies on an operating system (not shown) of a computer (not shown) in order to function properly. Creating a graphic document may include either using a pen-based system or using a mouse-based system.

The output of the generic graphics method 10 is transmitted through a handle 12 to a persistent graphics memory 14. The handle 12 is a unique address or code defined by the operating environment or system and is used by a program to identify and access an object, such as a form or control. The handle 12 allows the generic graphics method 10 to transmit information to the persistent graphics memory 14. The operating system of the computer creates the handle 12 when it is needed. Generally, the handle 12 is needed when the generic graphics method 10 is invoked.

The persistent graphics memory 14 then transmits the data to a screen device context 16 after the data has been stored therein. A device context, the screen device context 16 in particular, is a link between a Windows®-based application, a device driver, and an output device such as a display, printer or plotter. The screen device context 16 transmits the data to the device driver 18 so that the data may be output through the output display 20 in a manner visible and commensurate with the input into the generic graphics method 10. The persistent graphics memory 14 automatically retains the graphics generated by the generic graphics method 10 in order to regenerate the graphics when certain types of screen events occur which include, but are not limited to, a form that is redisplayed after being hidden behind another window which has temporarily obscured the graphic. The persistent graphics memory 14 also enables the graphics to be stored in a database (not shown) for long-term storage in document form to be retrieved at a later time.

The architecture shown in FIG. 1 is suitable for low powered graphics production typical of a casual, non-professional setting. More specifically, this architecture is not suitable for generating a document as if it were equivalent to an ink/paper counterpart because the data entering and exiting the persistent graphics memory 14 is delayed a time period which is substantial. This time period delays the operator of the generic graphics method 10 from utilizing the pen tool in a fashion similar to an ink pen because the operator must wait for the computer even when the operator is ready to create new electronic marks in the document being generated by the generic graphics method 10.

Figure 2:
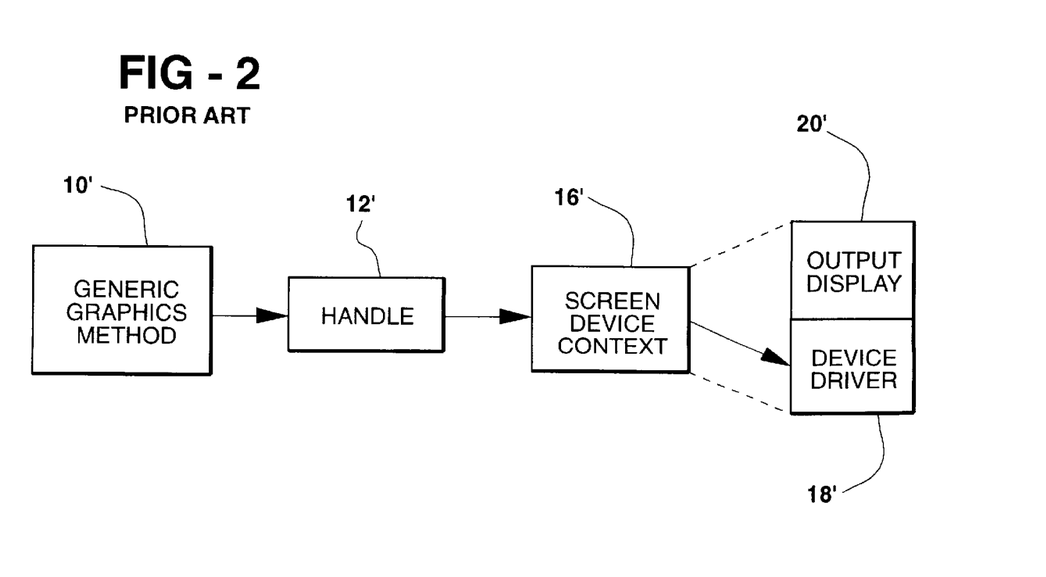
FIG. 2 is a block diagram displaying a second architecture with functional elements for a pen-based computer known in the prior art.

Referring to FIG. 2, a second architecture of the prior art is shown wherein like prime numerals represent similar structure as that shown in FIG. 1. The generic graphics method 10' transmits data generated by the operator using the pen tool to the handle 12'. The handle 12' differs from the handle 12 of FIG. 1 in that the handle 12' is dedicated to link the generic graphics method 10' to the screen device context 16'. The handle 12' is not interchangeable with the handle 12 of FIG. 1 because the handle 12' directs data to a different location than that by the handle 12. The output of the screen device context 16' is received by a device driver 18' which operates the output display 20', a screen in this embodiment. This architecture allows for rapid regeneration of the data input by the operator using a pen tool through the generic graphics method 10' by the output display 20' to mimic more closely the ink pen/paper counterpart. Although this architecture allows for the rapid regeneration of data by the output display 20', this architecture is not capable of storing the data in any type of memory to be retrieved at a later time. Therefore, if this architecture is used, the graphics generated will be destroyed even if a window is brought onto the output display 20' over the document being generated. The functionality of this architecture is limited to very few situations where it might be appropriate.

Therefore, there is a need in the art for a pen-based computer system that generates data using "electronic ink," i.e., electronic marks generated by a pen tool on a pen-based computer system, which more accurately mimics its traditional counterparts, i.e., ink on paper. A pen-based computer system requires speed to reduce the delay from compiling so much data with respect to the generation of an electronic document with electronic ink using a pen-based computer system.

SUMMARY OF THE INVENTION

A method is disclosed for generating an electronic document using a pen tool and a pen-based computer. The pen-based computer includes a memory to store graphics generated using the pen tool, an operating system memory, and a screen output display responsive to the pen tool. The method commences with the step of touching the pen tool to the screen output display to define a starting point for an electronic mark on the electronic document. A graphics handle device context is created to control the screen output display. A graphics handle memory is created to operate independently of the graphics handle device context. The graphics handle memory controls the memory used to store graphics. The pen tool is then moved along the screen output display to create the electronic mark on the electronic document. The electronic mark is displayed on the screen output display. The electronic mark is stored in the memory independently of the step of displaying the electronic mark on the screen output display.

This method provides the advantage of generating an electronic document using a pen tool and a pen-based computer. Another advantage associated with this method is the ability to generate an electronic document as quickly as data is entered into the pen-based computer with the pen tool. Still another advantage associated with this method is the ability for a pen-based computer to more exactly mimic the traditional document generating combination of the ink pen and paper.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 3:
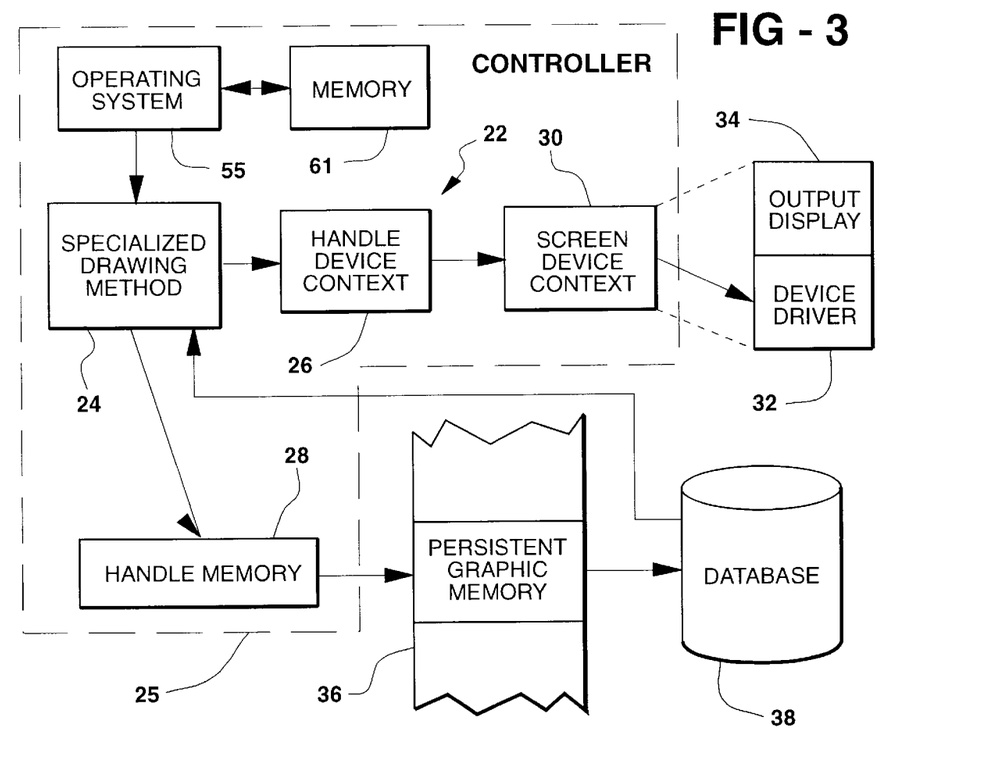
FIG. 3 is a block diagram displaying an architecture with functional elements of one embodiment of the invention.

Referring to FIG. 3, an architecture employing the method of the invention is generally indicated at 22. A specialized drawing method 24 is used by the operator of the pen-based computer having a controller or microprocessor 25. It should be appreciated by those skilled in the art that although the subsequent description will detail the invention in terms of a pen-based computer, other computer systems which may utilize the inventive method include, but are not limited to, systems incorporating input devices such as a mouse, keyboard, touch screen, light-sensitive screen, digitizer tablet, and the like. The specialized drawing method 24 is similar to the generic graphics method 10, 10' in that it generates graphics using a pen tool or mouse by calculating the positions of the starting point, the movement, and the termination point of an electronic mark. The specialized drawing method 24 differs therefrom in that it is capable of outputting to both a handle device context 26 and a handle memory 28. More specifically, the specialized drawing method 24 outputs identical data generated by the pen-based computer in response to movement of a pen tool 54 (shown in FIG. 4) by the operator to both the graphics handle screen device context 26 and the graphics handle memory 28 independently of each other. More specifically, the specialized drawing method 24 outputs data in a manner that enables the graphics handle screen device context 26 and the graphics handle memory 28 to receive the same data such that the two handles 26, 28 may operate without concert therebetween.

Once the data is received by the graphics handle screen device context 26, a screen device context 30 receives the data and transmits the data to a device driver 32 to operate an output display 34, namely a computer screen monitor.

The graphics handle memory 28 transmits the data from the specialized drawing method 24 directly to a persistent graphics memory 36. The persistent graphics memory 36 operates similar to that of the persistent graphics memory 14, discussed above. Similar to that discussed above but shown in FIG. 3, data stored in the persistent graphics memory 36 may be stored in a database 38. The database 38 is a memory device capable of storing data, having addresses, to quickly retrieve the data therefrom to be used at a later time. The specialized drawing method 24 is capable of receiving data from the database 38 allowing it to be displayed by the output display 34. In this manner, data previously stored in the database 38 may be modified using the specialized drawing method 24.

Figure 4:
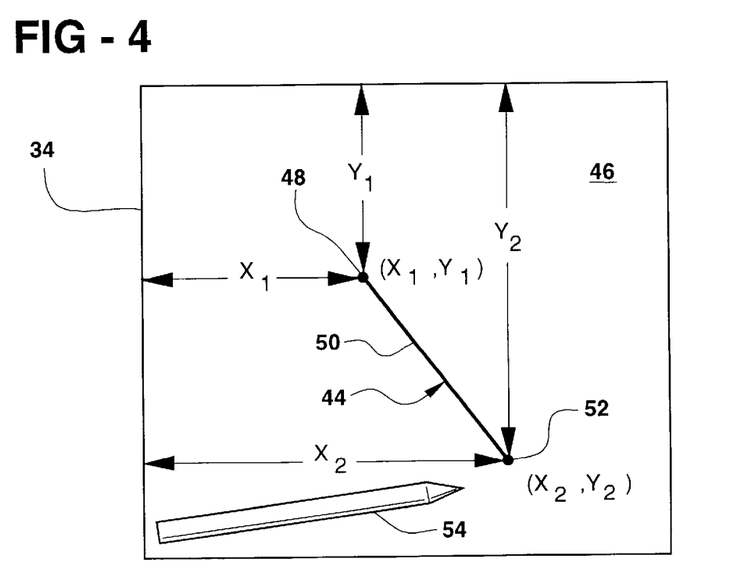
FIG. 4 is a graphic diagram showing a pen tool and display of an electronic mark identified by Cartesian coordinates generated by the embodiment of the inventive method.

Referring to FIG. 4, an electronic mark 44 is shown on an electronic document 46 as represented from an output display 34. The electronic mark 44 includes a pen initiating event 48, a pen moving event 50, and a pen lifting event 52. The electronic mark 44 is shown in terms of Cartesian coordinates starting at point $(x_1,y_1,)$ identified by the pen initiating event 48 and ending at the pen lifting event 52 $(x_2,y_2)$. In the example shown in FIG. 4, the pen moving event 50 is represented as a straight line. It should be appreciated by those skilled in the art that coordinate systems other than Cartesian coordinates and lines other than straight lines may define and compose an electronic mark 44, respectively.

To create a pen initiating event 48, the operator merely needs to touch a pen tool 54 to the output display 34. If a mouse system is being used, the mouse (not shown) would move the cursor to the point on the output display 34 where it would be clicked.

Underlying the steps of placing the pen tool on the output display 34 to generate a pen initiating event 48, followed by the movement of the pen tool 54 across the output display 34 to create an electronic mark 44 and subsequently lifting the pen tool 54 from the output display 34 to terminate the electronic mark 44, a method is required by the controller 25 to generate the electronic mark 44 on the electronic document 46. The method utilizes the pen tool 54 and the controller 25 of the pen-based computer. The controller 25 uses the persistent graphics memory 36 to store graphics comprised of electronic marks 44 therein. The controller 25 also includes an operating system 55 and the screen output display 34 sensitive to the pen tool 54.

Figure 5:
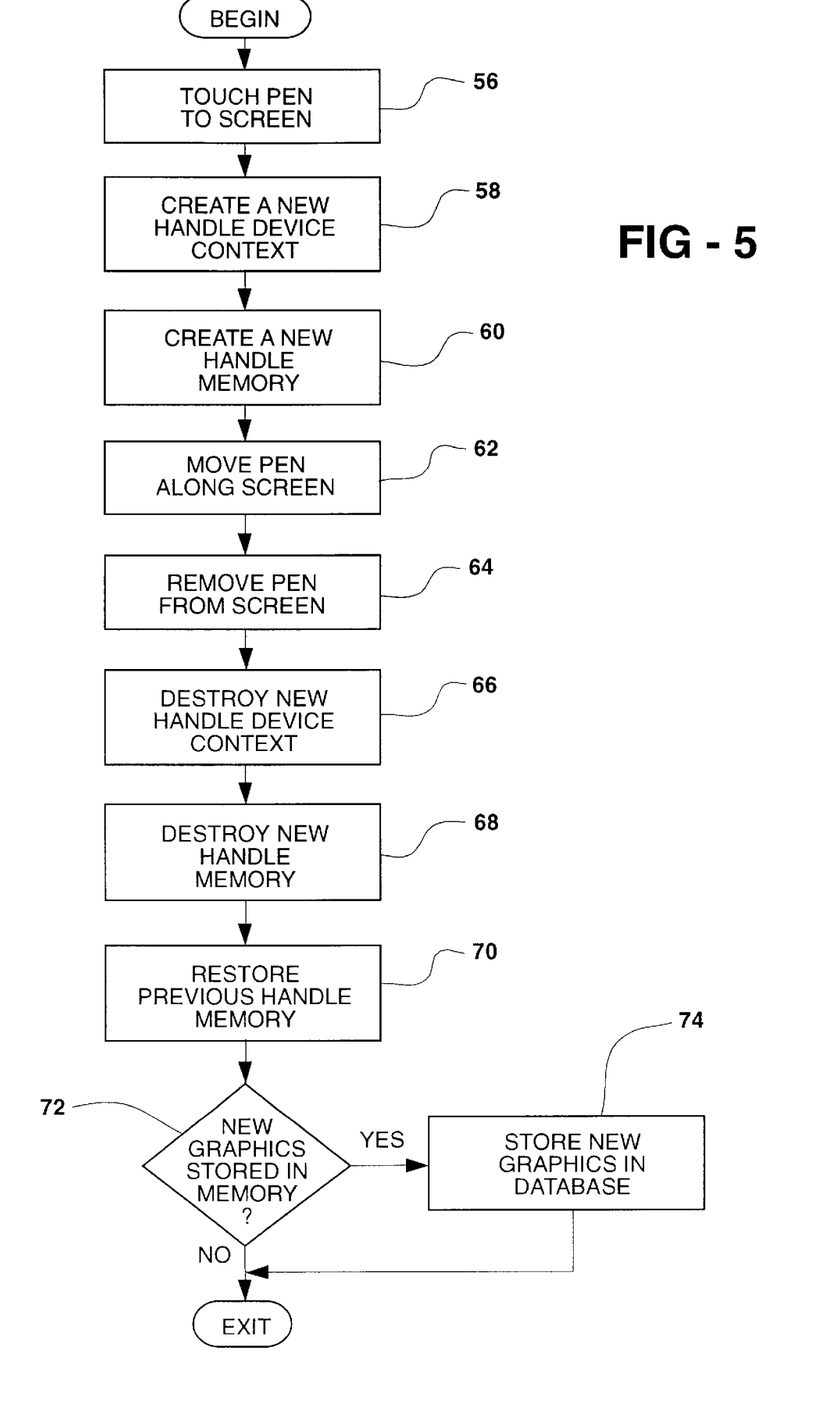
FIG. 5 is a flow chart representing the embodiment of the inventive method for generating an electronic mark on a document.

Referring to FIG. 5, the method is shown in flow chart form. The method begins by touching the pen tool 54 to the screen output display 34 at block 56. By touching the pen tool 54 to the screen output display 34, a starting point is defined for the electronic mark 44 on the electronic document 46. This is the pen initiating event 48. A new graphics handle screen device context 26 is created at block 58. The graphics handle screen device context 26 is a graphics handle device context and is used to control the screen output display 34. A new graphics handle memory 28 is created at 60. The graphics handle memory 28 is a handle which operates independently of the graphics handle screen device context 26. The graphics handle memory 28 directs or points data generated by the specialized drawing method 24 to the persistent graphics memory 36 used to store the graphics therein. The pen tool 54 is then moved along the screen output display at block 62 to generate the length 50 of the electronic mark 44. The electronic mark 44 becomes a part of the electronic document 46. The pen tool 54 is then removed from the screen output display 34 at block 64. The electronic mark 44 is displayed on the screen output display 34. The electronic mark 44 is also stored in the persistent graphics memory 36 independently of the step of displaying. More specifically, although the electronic mark 44 is shown on the screen output display 34 and, at the same time, stored in the persistent graphics memory 36 in a manner such that the electronic marks 44 are identical, the electronic mark 44 shown on the screen output display 34 is not the same electronic mark 44 as that which is stored in the persistent graphics memory 36. In other words, the creation of the electronic mark 44 actually generates two electronic marks, one displayed on the screen output display 34 and the other in persistent graphics memory 36. The method operates in a manner such that both electronic marks 44 are created although their existence is independent of each other. This allows the operator of the pen tool 54 the ability and comfort of seeing the generation of the electronic mark 44 on the screen output display 34 immediately without having to wait for the electronic mark 44 to be stored in the persistent graphics memory 36. Although the time delay incurred when placing data in the persistent graphics memory 36 before displaying the electronic mark 44 is small in the prior art method of FIG. 1, it is enough to inhibit the operator from using the pen tool 54 in a fashion similar to an ink pen.

Once the pen tool 54 is removed from the screen output display 34, the new graphics handle screen device context 26 is destroyed at block 66. The graphics handle screen device context 26 is released or destroyed from the specialized drawing method 24. Also, the new graphics handle memory 28 is destroyed at block 68. Because the operating system must be able to access the persistent graphics memory 36, the previous graphics handle memory (not shown) is restored at block 70 to allow the specialized drawing method 24 and the operating system 55 to operate as it was designed to ensure compatibility with other programs executed by the operating system 55. It is then determined at diamond 72 whether the new electronic mark 44 which comprises the graphics should be stored in a longer term memory such as the database 38. If so, the new electronic mark 44 is stored in the database 38 at block 74. If not, the method is terminated.

Figure 6:
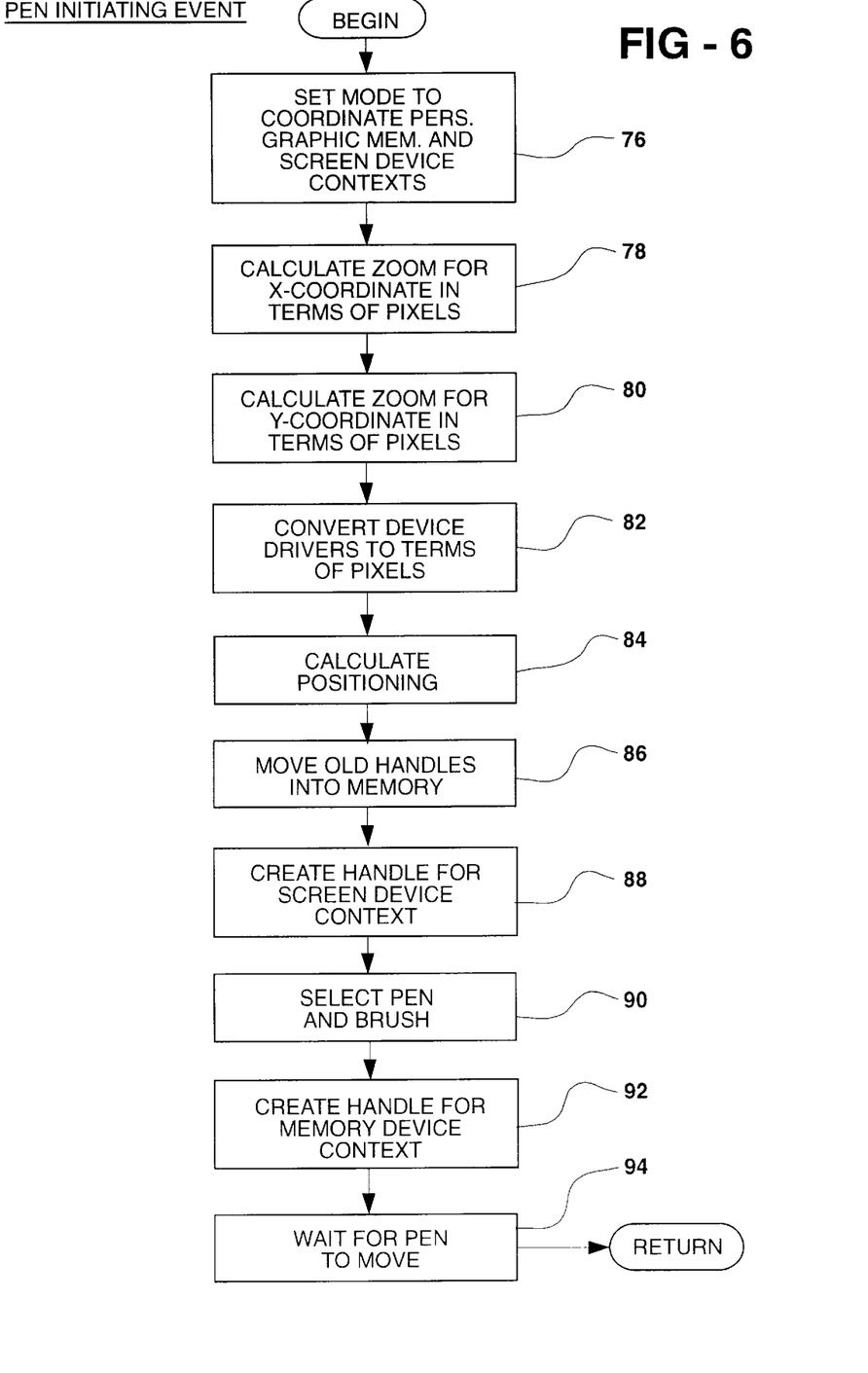
FIG. 6 is a flow chart of a portion of an inventive method detailing the creation of a pen initiation event.

Referring to FIG. 6, the method for generating a pen initiating event 48 is shown in greater detail in flow chart form. The method begins with setting a mode to coordinate persistent graphics memory 36 and the screen device context 30 at block 76. Zoom, the relationship between the screen spatial coordinates, is then calculated for the x-coordinate in terms of pixels at block 78. Pixels are identified at the units of the screen output display 34 which may emit a particular color of light. The zoom for the y-coordinate is then calculated in terms of pixels at 80. The zoom for both the x- and y-coordinates must be calculated to determine the proper configuration of the output as it is emitted from the screen output display 34. In some instances, a portion of the screen output display 34 is not available for displaying a particular graphic or electronic mark 44 because it is dedicated to another function. In this case, the x- and y-coordinates will not map onto the screen output display 34 in a one-to-one relationship. Further, because the standard screen output display 34 does not have the same number of pixels in the horizontal direction as it does in the vertical direction, zoom for each of these coordinates must be calculated separately because they are usually different.

The device driver 32 is then instructed to operate in terms of pixels at block 82. From identifying the device driver 32 in terms of pixels and calculating the zooms for the x- and y-coordinates, the actual position of the pen tool 54 as it touches the screen output display 34 may be calculated at block 84. These calculations are required because the generic graphics method 10, which normally performs these calculations automatically, has been disabled. Therefore, the data for the electronic mark 44 requires the zoom calculations to properly store the data in the persistent graphics memory 36.

The old graphics handle for the screen device context 30 and the persistent graphics memory 36 are then placed into the memory 61 of the operating system 55 at block 86. A graphics handle 26 for the screen device context 30 is then created at block 88. This step is discussed above and shown at block 58 in FIG. 5.

Pen and brush commands are then selected at block 90. The pen and brush commands identify the characteristics of the type of stroke to be made to generate the electronic mark 44. It is at this point that the color, thickness, and consistency of the electronic mark 44 are determined.

The graphics handle 28 for the memory is then created at block 92. This step for creating the graphics handle is similar to step 60 in FIG. 5. A waiting period at block 94 is terminated once the pen tool 54 moves. Once the pen tool 54 moves, the pen initiating event 48 has occurred.

Figure 7:
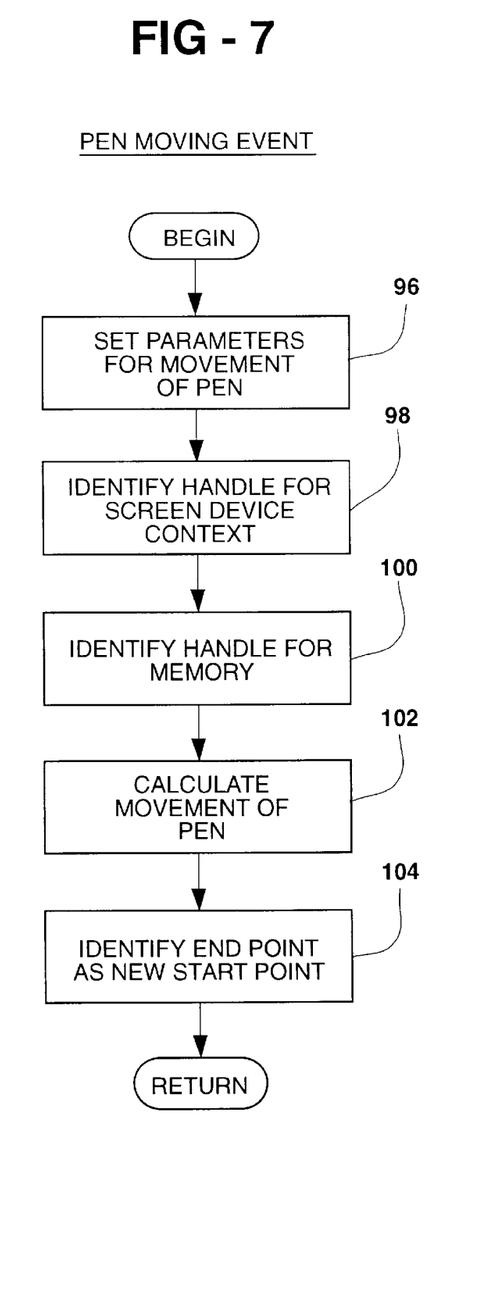
FIG. 7 is a flow chart of a portion of an inventive method detailing the correlation of an electric mark to movement of a pen.

Referring to FIG. 7, the method for generating a pen moving event 50 is shown in flow chart form. Parameters for movement of the pen tool 54 are set at block 96. The parameters include setting the start point, i.e., the step 84 of calculating position, and the steps 78, 80 of calculating zoom for each coordinate in the system, discussed above. The graphics handle device context 26 for the screen device context 30 is identified at block 98. The graphics handle for the persistent graphics memory 36 is identified at block 100. The movement of the pen tool 54 is then calculated at block 102 using the Cartesian coordinates shown in FIG. 4. The movement is calculated or derived using the specialized drawing method 24. The pen terminating event 52 identifies a terminating point of the electronic mark 44 which is then identified as a new start point similar to a pen initiating event 48 at block 104. This event of identifying the terminating point of the electronic mark 44 as a start point of the electronic mark 44 allowing for a continuous electronic mark 44. This step 104 also eliminates the need to lift the pen tool 54 from the screen output display 34 after every change in direction of the electronic mark 44 as desired by the operator. Once the pen tool 54 ceases to move, the pen moving event 50 is complete.

Figure 8:
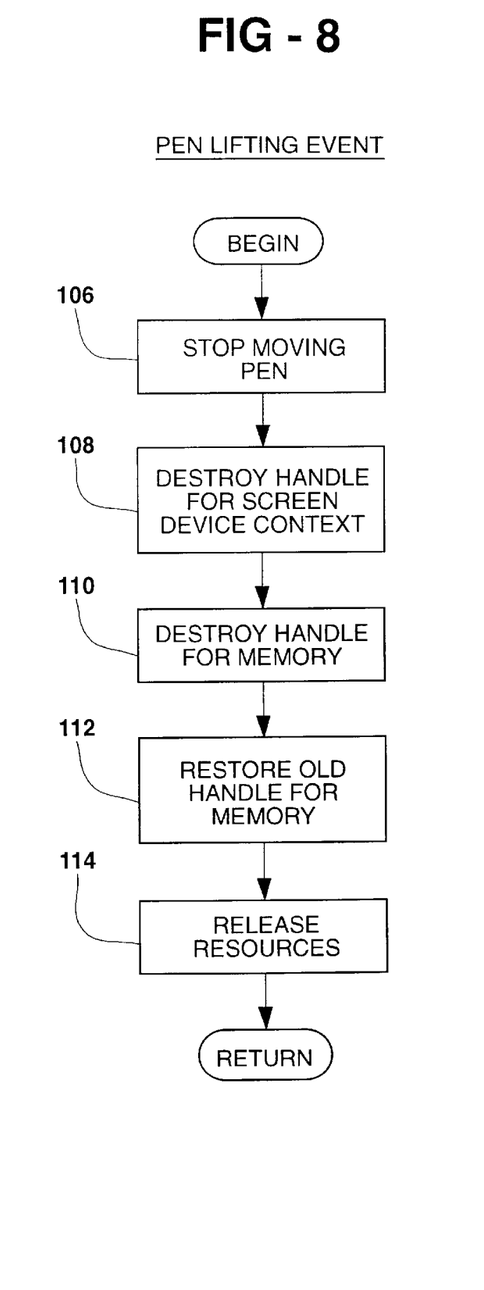
FIG. 8 is a flow chart of a portion of an inventive method detailing the correlation of the lifting of the pen to the termination of the electronic mark.

Referring to FIG. 8, the method for the pen lifting event 52 is shown in flow chart form. The pen lifting event 52 begins by the stopping of movement of the pen tool 54 at block 106. Once the pen tool 54 has been stopped, it is lifted away from the screen output display 34. The graphics handle 26 for the screen device context 30 is released or destroyed at block 108. The graphics handle 28 for the persistent graphics memory 30 is destroyed at block 110. The destruction of the two graphics handles that were previously created at the pen initiating event 48, FIG. 6, is required to return the operating system 55 to its previous status to avoid further complications in the operating system 55 should this program be exited and other programs entered which may rely on the handles for graphics and memory.

The old handle memory 28 for the persistent graphics memory 36 is restored from memory 61 at block 112. The previous graphics handle screen device context which previously existed is not needed to be restored as it will be created anew each time the operating system 55 requires. Resources, namely the pen and brush characteristics set forth in step 88, are then released at block 114. The identification of these resources allows the pen tool 54 to generate an electronic mark 44 of a particular characterization. The resources must be released at 114 after each lifting of the pen tool 54 because the resources provided by the operating system 55 are limited. The releasing of the resources allows the specialized drawing method 24 and the operating system to operate in a fashion which maximizes output.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A method for generating an electronic document using a pen tool and a pen-based computer having a persistent graphics memory to store graphics generated using the pen tool, an operating system memory, and a screen output display sensitive to the pen tool, the method comprising the steps of:

touching the pen tool to the screen output display to define a starting point for an electronic mark on the document;

creating a graphics handle screen device context to control the screen output display;

creating a graphics handle memory to operate independently of the graphics handle screen device context, the graphics handle memory controlling the persistent graphics memory used to store the electronic mark;

moving the pen tool along the screen output display to create the electronic mark on the electronic document;

transmitting data representing the electronic mark into the graphics handle screen device context;

transmitting data representing the electronic mark into the graphics handle memory independently of the step of transmitting data into the graphics handle screen device context;

displaying the electronic mark on the screen output display; and storing the electronic mark in the persistent graphics memory independently of the step of displaying.

2. A method as set forth in claim 1 including the step of storing an operating system handle memory in the operating system memory prior to the step of creating the graphics handle screen device context.

3. A method as set forth in claim 2 including the step of removing the pen tool from the screen output display to define a terminating point for the electronic mark on the electronic document.

4. A method as set forth in claim 3 including the step of destroying the graphics handle screen device context after the step of removing the pen tool from the screen output display.

5. A method as set forth in claim 3 including the step of destroying the graphics handle memory after the step of removing the pen tool from the screen output display.

6. A method as set forth in claim 5 including the step of restoring the operating system handle memory from the operating system memory after the step of destroying the graphics handle memory.

7. A method as set forth in claim 3 including the step of identifying resources to recognize the pen tool after the step of touching the pen tool to the screen output display.

8. A method as set forth in claim 7 including the step of releasing the resources after the step of removing the pen tool from the screen output display.

9. A method for generating a document using an electronic mark generating device and a computer having a persistent graphics memory to store graphics generated using the electronic mark generating device, an operating system memory, and a screen output display, the method comprising the steps of:

activating the electronic mark generating device to define a starting point for an electronic mark on the document;

creating a graphics handle screen device context to control the screen output display;

creating a graphics handle memory to operate independently of the graphics handle device, the graphics handle memory controlling the persistent graphics memory used to store graphics;

creating the electronic mark on the document using the electronic mark generating device;

transmitting data representing the electronic mark into the graphics handle screen device context;

transmitting data representing the electronic mark into the graphics handle memory independently of the step of transmitting data into the graphics handle screen device context;

displaying the electronic mark on the screen output display; and storing the electronic mark in the persistent graphics memory independently of the step of displaying.

10. A method as set forth in claim 9 including the step of storing an operating system handle memory in the operating system memory prior to the step of creating the graphics handle device context.

11. A method as set forth in claim 10 including the step of deactivating the electronic mark generating device to define a terminating point for the electronic mark on the document.

12. A method as set forth in claim 11 including the step of destroying the graphics handle device context after the step of removing the pen tool from the screen output display.

13. A method as set forth in claim 11 including the step of destroying the graphics handle memory after the step of removing the pen tool from the screen output display.

14. A method as set forth in claim 13 including the step of restoring the operating system handle memory from the operating system memory after the step of destroying the graphics handle memory.

15. A method as set forth in claim 11 including the step of identifying resources to recognize the electronic mark generating device after the step of activating the electronic mark generating device.

16. A method as set forth in claim 15 including the step of releasing the resources after the step of deactivating the electronic mark generating device.

17. A method for generating an electronic document using a pen tool and a pen-based computer having a persistent graphics memory to store graphics generated using the pen tool, an operating system memory, and a screen output display sensitive to the pen tool, the method comprising the steps of:

touching the pen tool to the screen output electronic display to define a starting point for an electronic mark on the document;

storing an operating system handle memory in the operating system memory;

creating a graphics handle screen device context to control the screen output display;

creating a graphics handle memory to operate independently of the graphics handle device context, the graphics handle memory controlling the persistent graphics memory used to store graphics;

moving the pen tool along the screen output display to create the electronic mark on the electronic document;

displaying the electronic mark on the screen output display;

storing the electronic mark in the persistent graphics memory independently of the step of displaying;

removing the pen tool from the screen output display to define a terminating point for the electronic mark on the document;

destroying the graphics handle screen device context after the step of removing the pen tool from the screen output display;

destroying the graphics handle memory after the step of removing the pen tool from the screen output display; and restoring the operating system handle memory from the operating system memory after the step of destroying the graphics handle memory.

\* \* \* \* \*